United States Patent [19]

Hill

[11] 4,265,353

[45] May 5, 1981

[54] CAPSULE APPARATUS FOR TRANSPORTING A DISABLED PERSON

[75] Inventor: Alvin J. Hill, Coal City, W. Va.

[73] Assignee: Eastern Associated Coal Corp., Pittsburgh, Pa.

[21] Appl. No.: 27,182

[22] Filed: Apr. 4, 1979

[51] Int. Cl.³ .............................................. B65G 17/00

[52] U.S. Cl. ......................................... 198/321; 27/35

[58] Field of Search ..................... 128/1 B; 27/11, 31, 27/35; 5/118, 119, 82 R; 198/321, 322, 323

[56] References Cited

U.S. PATENT DOCUMENTS

| | | | |
|---|---|---|---|
| 2,299,993 | 10/1942 | Kirk | 5/82 |
| 2,649,955 | 8/1953 | Buckeridge | 198/322 |
| 2,706,473 | 4/1955 | Armstrong et al. | 128/1 B |
| 3,408,711 | 11/1968 | Pauliukonis | 27/11 |
| 4,023,219 | 5/1977 | Shindler | 5/82 |
| 4,183,110 | 1/1980 | Kidd et al. | 5/82 |

*Primary Examiner*—Jeffrey V. Nase
*Assistant Examiner*—Brian Bond
*Attorney, Agent, or Firm*—Thomas H. Murray; Clifford A. Poff

[57] ABSTRACT

A capsule apparatus for transporting a disabled person from an underground mine or over rough terrain aboveground includes an elongated base with upstanding side walls extending about the periphery of the floor which has inclined forward and aft floor sections. A plate extends from the floor of the base between opposed side walls thereof to define a supply compartment at one side of the plate and a disabled person compartment at the other side of the plate. The plate is adjustably fastened to the side walls of the base. The base is provided with a mattress to support the disabled person. Elongated top sections include abutting end surfaces to form a top closure which is releasably secured by latch members to the elongated base. A sliding window for a hatch within one of the top sections for visual monitoring and voice communication is used to provide continued first aid for an injured person therein. The base is coupled to a conveyor belt by anchor members with releasable clamp jaws. The anchor members are joined to the base by cables. Rails are attached by locking hinge members to swing for use as skid runners and handrails.

12 Claims, 6 Drawing Figures

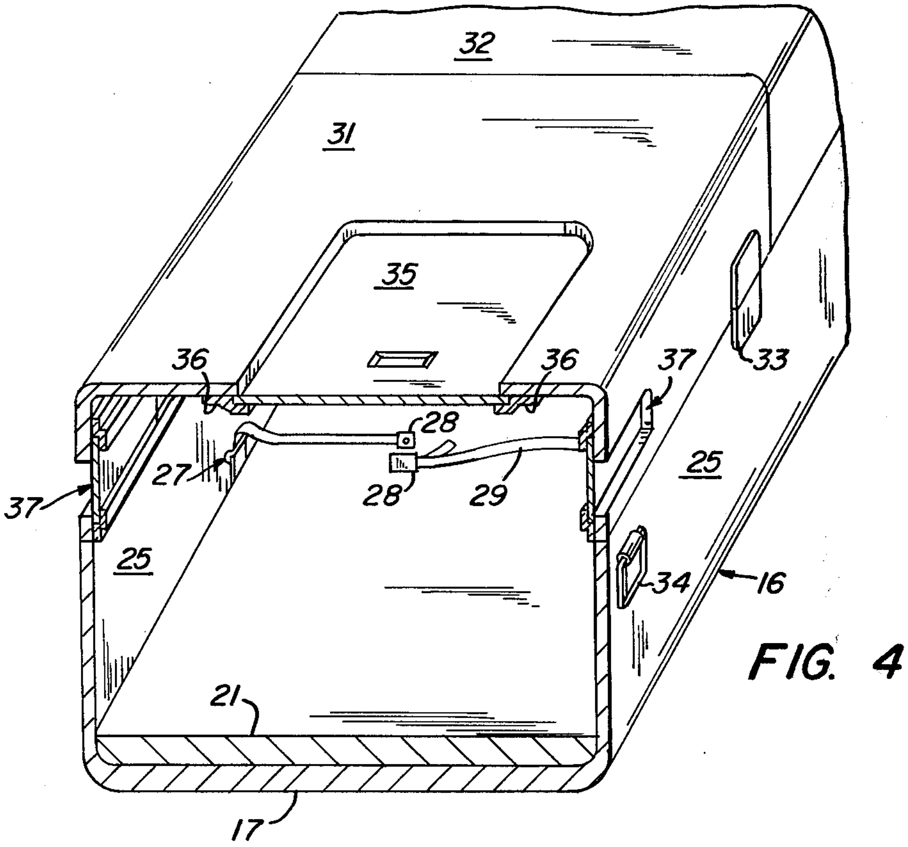
FIG. 4
FIG. 3
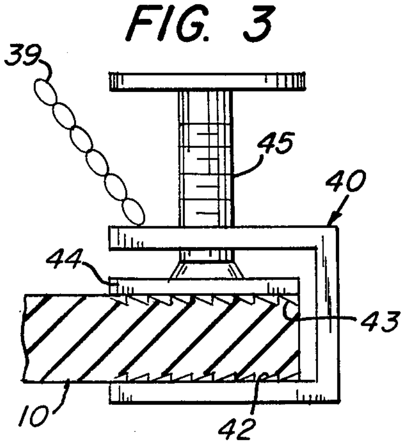
FIG. 5
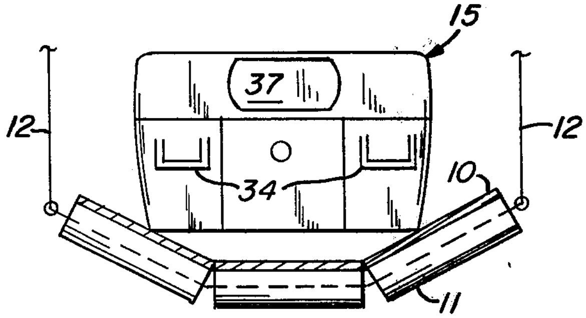

CAPSULE APPARATUS FOR TRANSPORTING A DISABLED PERSON

BACKGROUND OF THE INVENTION

This invention relates to a capsule apparatus to protectively support an injured, sick or otherwise disabled person while transported from an industrial, recreational or military site by essentially any suitable means to some designated first-aid area.

In the past, a person disabled due to sickness or accident was transported from the hostile environment by a stretcher to a selected site for continued transportation by a ground vehicle or by air transport such as by a helicopter. While not so limited, the present invention is particularly useful for transporting a disabled person from an underground mine site through the utilization of a capsule enclosure which is coupled to a conveyor belt or other conveyance medium for transportation to a first-aid or other designated treatment area. The traditional stretcher has been used in coal mines for a number of years to transport an injured person on conveyor belts. However, the traditional stretcher lacks rigidity and fails to protect against further injury. Because of this, it is desirable and even required in certain mine sites that each working area which is not served by a track-mounted or rubber-tired vehicle but using conveyor belts for the removal of coal, is equipped with a device within which an injured person can be placed and transported by the belt conveyor to the surface or transportation facilities. The device developed for this purpose must meet the need for use in a work area having a low ceiling height, e.g., 42 inches. In such an area, the freedom of movement by assisting personnel is restricted with respect to loading the injured person onto the device and movement thereof along the floor. Moreover, first-aid supplies must be accessible for immediate use.

SUMMARY OF THE INVENTION

It is an object of the present invention to provide a capsule apparatus for protecting a disabled person from further injury by providing a protective enclosure for comfort, warmth and to lessen the degree of shock while transported.

It is a still further object of the present invention to provide a capsule apparatus for mobile handling under difficult conditions and ease for loading and unloading of a patient from a protective enclosure.

It is another object of the present invention to eliminate or at least minimize the possibility of inflicting injury to a disabled person by providing a capsule apparatus having a solid bottom with inclined portions thereof to facilitate transporting movement along a support surface as well as protecting the occupant against protruding objects while providing for the safe and secure attachment of a belt conveyor or other conveyance medium so that the capsule is retained against sliding or rolling movement while transported.

More particularly, according to the present invention, there is provided a capsule apparatus for transporting a disabled person, the apparatus including the combination of an elongated base including upstanding side walls extending about the periphery of a floor with inclined forward and aft floor sections to facilitate transporting movement along a support surface, subdividing means to define at opposite sides thereof a supply compartment and a disabled person compartment within the elongated base, means within the disabled person compartment of the base to support a person therein, elongated top sections having abutting end surfaces to form a protective top enclosure while supported by the side walls of the elongated base, latch means to releasably secure the elongated top sections to the elongated base, and window means supported by one of the elongated top sections for visual monitoring of a disabled person.

In the preferred form of the present invention, the capsule apparatus further includes ventilator means carried by one of the top sections for introducing air into the disabled person compartment of the base. The subdividing means further includes, if desired, fastener memebers to adjustably position a plate member within the elongated base for selecting the desired length to the disabled person compartment therein. Anchor means are employed to secure opposite ends of the elongated base to conveying means such as a conveyor belt. The anchor means preferably take the form of clamp members each including a frame with gripping surfaces, one adjustable relative to the other, to engage opposite sides of the conveyor belt under a releasable clamping force. The anchor means are further engaged with the base by means of cable members. Restraining devices, such as belts with releasable fasteners, are secured within the capsule to stabilize the injured person during tilting and other movements. A rail at each longitudinal side of the capsule is secured by lockable hinges for use as lifting handles and at other times for use as skid runners. A sliding or hinged hatch cover on the top of the capsule is used for visual and voice communication as well as immediate access to the injured person.

These features and advantages of the present invention as well as others will be more fully understood when the following description is read in light of the accompanying drawings, in which:

FIG. 3 is an enlarged sectional view taken along line III—III of FIG. 1;

FIG. 4 is an isometric view taken along line IV—IV of FIG. 1;

FIG. 5 is an end elevational view taken along line V—V of FIG. 1; and

Figure 1:
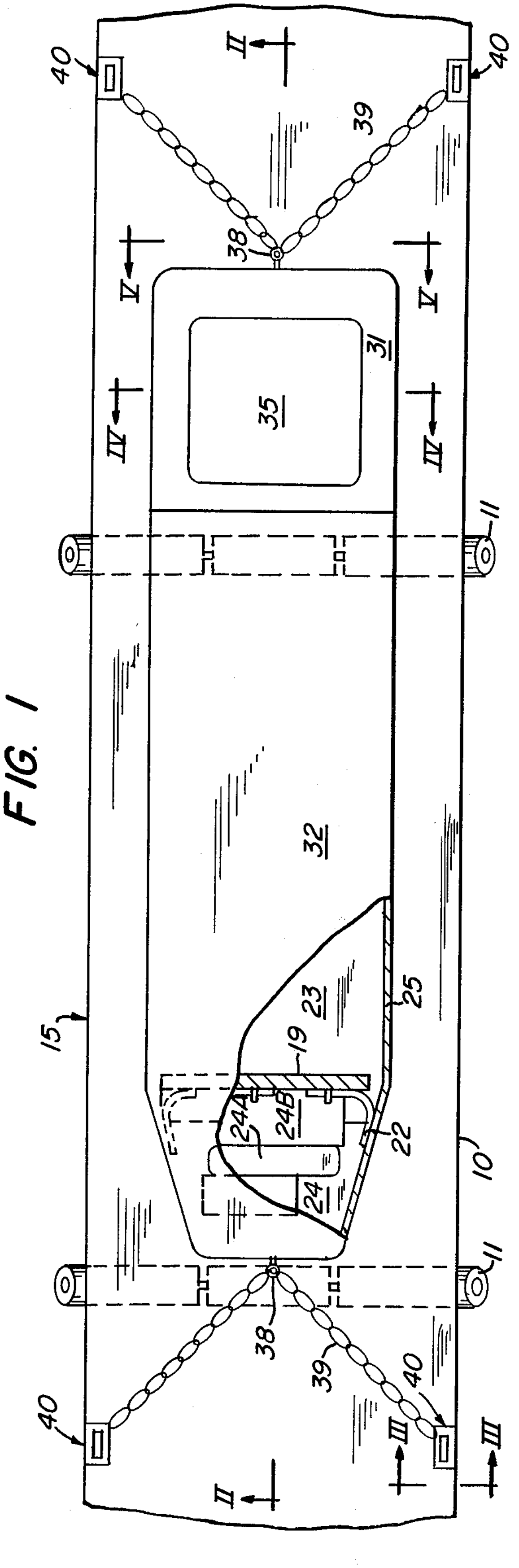
FIG. 1 is an elevational view of a capsule apparatus while anchored for transportation by a conveyor belt.

In the drawings, there is shown a conventional conveyor belt 10 which is supported by spaced-apart sets of three rollers 11 which are arranged in a generally end-to-end relation and supported for rotation by shafts that are, in turn, supported within a mine opening by cables 12 (FIG. 5). The conveyor belt engages tensioning and drive rollers, not shown, that form part of a belt-type conveyor used to transport a capsule which is generally identified in the drawings by reference numeral 15. The capsule includes an elongated base 16 having a floor wall 17 with upwardly-inclined leading and trailing floor sections 18 and 19, respectively. At the area where the leading floor section 18 adjoins the flat floor wall 17, there is an upstanding partition wall 19 within the capsule. The partition wall is normally spaced above the floor 17 for longitudinal movement within the capsule above a mattress 21 made of foamed rubber or other well-known forms of plastic cushioning material. The partition wall 19 is adjustably secured at a desired location by strap members 22. However, if desired, the partition wall 19 may be immovably supported by the side walls and/or floor. The partition wall 19 is secured at a desired site so as to define at one side thereof a disabled person compartment 23 and at the opposite side thereof a supply compartment 24. The compartments 23 and 24 are further defined by upstanding side walls 25 which extend about the periphery of the floor 17 including the leading and trailing floor sections 18 and 19. Compartment 24 is used for storage of first-aid supplies including, for example, an oxygen supply 24A and containers 24B for bandages as well as emergency medical appliances. The length of compartment 23 is preferably adjustable by movably positioning wall 19 to accommodate a disabled person. Belt assemblies 27 have release buckles 28 on the free ends of each belt 29. The assemblies are attached by clamps to the side walls 25. Three belt assemblies 27 are located at spaced-apart locations within compartment 23 to retain the ankle, abdomen and chest of a disabled person, thereby preventing discomfort and further injury by uncontrolled movement should tilting or rocking of the capsule occur.

Figure 2:
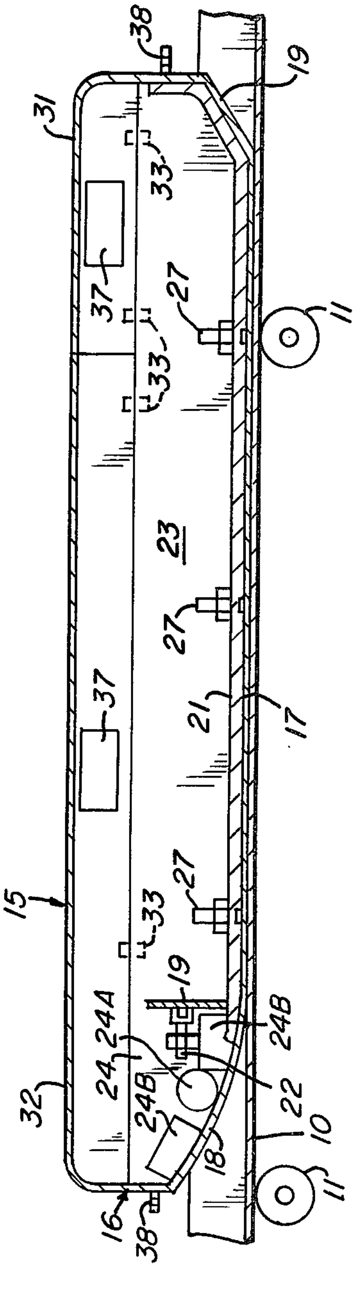
FIG. 2 is an elevational view, in section, taken along line II—II of FIG. 1.

Removably attached to the top of base 16 are top sections 31 and 32. As shown in FIGS. 1, 2 and 4, the top sections have abutting end surfaces to form a protective top closure to the base section while supported by the side walls 25 thereof. Each top section is releasably secured to the base section by a plurality of latch members 33 disposed at spaced peripheral locations about the base section. The side walls of the base section also support a plurality of handle members 34 for use by personnel to lift and position the capsule apparatus upon the conveyor belt. The top section 32 is disposed above the area of the compartment 23 where the head and shoulder portions of the disabled person would normally be located. A slideable hatch 35 made of safety glass or other transparent material forms both a window and an access opening for voice communication with the disabled person as well as monitoring vital signs of the person. Rails 36 support the hatch for sliding movement. Each top section includes a top wall with downwardly-extending side walls supported by the top surface of the side walls 25. The side walls of the top sections include ventilators 37. The ventilators shown in FIG. 4 take the form of slideably-supported transparent plates; however, louver-type ventilators are equally useful.

The forward and rear ends of the base 16 are provided with fasteners such as eyebolts 38 to couple one end of a cable such as chains 39 to the capsule. The free end of the chain is secured to an anchor assembly 40. As shown in FIG. 3, the anchor assembly includes a housing having a U-shaped cross section with a serrated or roughened surface 42 facing toward a similar surface 43 on an adjustable plate 44. The plate is moved toward and away from surface 42 by a threaded shaft 45. As clearly apparent from FIG. 1, the anchor devices 40 are employed at each side of the conveyor belt and at each end of the capsule whereby four such anchor devices are used to attach and retain the capsule on the conveyor in a manner to prevent unintentional disengagement from the conveyor belt during movement thereby.

As a typical example of the capsule apparatus of the present invention, it is contemplated that the walls of the capsule be made from fiberglass or other impact-resistant material. The capsule has a length of about 8 feet and a width of 27 inches. A height of about 16 inches is sufficient for providing a protective environment for a disabled person. The weight of the capsule apparatus is minimized to facilitate handling and movement by rescue personnel from, for example, an accident site to a loading site on a conveyor belt. During such movement, the upwardly-inclined floor sections enhance movement over rough terrain.

Figure 6:
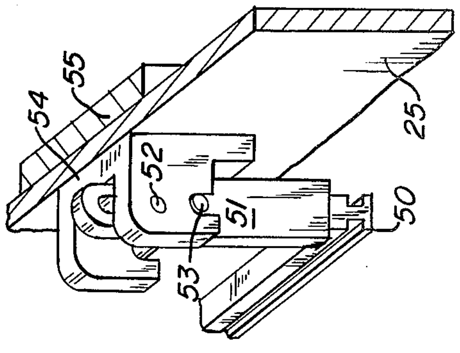
FIG. 6 is an enlarged isometric view of a lockable hinge for a combined handle-skid runner.

The capsule apparatus of the present invention is preferably provided with runner assemblies for movement along rough terrain. A suitable form of runner assembly is shown in FIG. 6. At each longitudinal side of the capsule, a runner rail 50 is welded or otherwise attached to the ends of spaced-apart arms 51, only one of which is shown. Each arm has a slotted opening receiving a hinge pin 52. A lock pin 53 extends from the sides of the arm between the slotted opening and the rail. The lock pin slides into recesses in a hinge plate 54 which supports the hinge pin 52. The hinge plate is attached by fasteners to the side or bottom wall of the capsule through the use of a backing plate 55. The parts are constructed such that, in the position shown in FIG. 6, the rail is locked against pivotal movement by locking pin 53 to form a skid or runner for movement along rough terrain. By moving the arm 51 to withdraw the locking pin 53 from the recesses in hinge plate 54, the rail is free to swing upwardly for use as a handrail to carry the capsule. While the foregoing description has been particularly addressed to the attachment of a capsule apparatus onto a belt conveyor, it is to be understood that, within the scope of the present invention, the capsule apparatus may be attached to other forms of conveyance devices.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A capsule apparatus for transporting a disabled person, said apparatus including the combination of:

an elongated base including upstanding side walls extending about the periphery of a floor with inclined forward and aft floor sections to facilitate transporting movement along a support surface, means within said elongated base for supporting a person therein, elongated top sections having abutting end surfaces to form a protective top closure while supported by the side walls of said elongated base, latch means for releasably securing said elongated top sections to said elongated base, window means supported by one of said elongated top sections for visual monitoring of a disabled person while located within the elongated base, conveyor means for supporting engagement with said elongated base, and anchor means secured to opposite ends of said elongated base for preventing unintentional disengagement from said conveyor means, said anchor means including clamp means with gripping surfaces for engaging said conveyor means.

2. The capsule apparatus according to claim 1 further including ventilator means carried by one of said top sections for introducing air into the disabled person compartment of said elongated base.

3. The capsule apparatus according to claim 1 wherein said top sections each includes a top wall joined with an end wall and two side walls, the end walls and two side walls being arranged to engage the side wall of said elongated base.

4. The capsule apparatus according to claim 1 further including a subdividing plate member upstanding from the floor of said elongated base between side walls thereof.

5. The capsule apparatus according to claim 4 wherein said subdividing means further includes fastener members to adjustably position said plate member within said elongated base for selecting the desired length of the disabled person compartment therein.

6. The capsule apparatus according to claim 1 wherein said conveying means includes a conveyor belt.

7. The capsule apparatus according to claim 6 wherein said clamp members each includes a frame having a gripping surface for engaging one face of said conveyor belt, and a load transfer member having a gripping surface adjustably supported by said frame opposite the gripping surface thereof for releasable clamping engagement with said conveyor belt.

8. The capsule apparatus according to claim 6 wherein said anchor means further includes cable members joined to opposite ends of said elongated base and coupled to said conveyor belt by said clamp means.

9. The capsule apparatus according to claim 1 further including runner rails supporting said base for transporting movement.

10. The capsule apparatus according to claim 9 further including lockable hinge means carried by said base to support said runner rails in a first position wherein said rails define skid runners, and in a second position wherein said rails define a handrail for carrying said base.

11. The capsule apparatus according to claim 1 wherein one of said elongated top sections further includes hatch means for access into the disabled person compartment.

12. A capsule apparatus for transporting a disabled person, said apparatus including the combination of:

an elongated base including upstanding side walls extending about the periphery of a floor with inclined forward and aft floor sections to facilitate transporting movement along a support surface, means within said elongated base for supporting a person therein, elongated top sections having abutting end surfaces to form a protective top closure while supported by the side walls of said elongated base, latch means for releasably securing said elongated top sections to said elongated base, window means supported by one of said elongated top sections for visual monitoring of a disabled person while located within the elongated base, runner rails for supporting said base, and lockable hinge means carried by said base to support said runner rails in a first position wherein said rails define skid runners, and in a second position wherein said rails define a handrail for carrying said base.

* * * * *